US011811746B2

(12) United States Patent
Woodward et al.

(10) Patent No.: US 11,811,746 B2
(45) Date of Patent: *Nov. 7, 2023

(54) SYSTEMS AND METHODS FOR USING JWTS FOR INFORMATION SECURITY

(71) Applicant: SHAYRE, INC., Burbank, CA (US)

(72) Inventors: Christopher John Woodward, Hermosa Beach, CA (US); Christopher Joseph Monte, Los Angelese, CA (US); Matthew Lyle Comeione, Burbank, CA (US)

(73) Assignee: SHAYRE, INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,667

(22) Filed: Feb. 23, 2023

(65) Prior Publication Data

US 2023/0198972 A1 Jun. 22, 2023

Related U.S. Application Data

(63) Continuation of application No. 17/230,868, filed on Apr. 14, 2021, now Pat. No. 11,632,362.

(51) Int. Cl.
*H04L 9/40* (2022.01)
*H04L 9/32* (2006.01)

(52) U.S. Cl.
CPC ............... *H04L 63/08* (2013.01); *H04L 9/32* (2013.01)

(58) Field of Classification Search
CPC . H04L 63/08; H04L 9/32; H04L 9/006; H04L 9/3234; H04L 63/0876; H04L 63/102; H04L 63/0428; H04L 9/088
See application file for complete search history.

(56) References Cited

U.S. PATENT DOCUMENTS

| | | | |
|---|---|---|---|
| 6,678,682 B1 * | 1/2004 | Jenkins | H04L 63/101 707/999.009 |
| 7,613,770 B2 | 11/2009 | Li | |
| 7,703,142 B1 | 4/2010 | Wilson | |
| 8,122,488 B2 | 2/2012 | Hoch | |
| 8,266,433 B1 * | 9/2012 | Przykucki | H04L 63/06 713/168 |
| 8,745,718 B1 | 6/2014 | Dufel | |

(Continued)

*Primary Examiner* — Aravind K Moorthy
(74) *Attorney, Agent, or Firm* — ESPLIN & ASSOCIATES, PC

(57) ABSTRACT

Systems and methods for using JavaScript Object Notation (JSON) Web Tokens for information security for a particular software-controlled application are disclosed. Exemplary implementations may: store information electronically, including different types of client-provided information, hardware information, key information, and permission information; provide individual JWTs that include individual expiration dates to individual users; receive a user request for continued access and/or use of the particular software-controlled application; perform different types of (automated) verification based on the client-provided information in the user request; and, responsive to particular results from the different types of verification, perform some combination of transferring a response to the user request and accepting or denying continued access and/or use of the particular software-controlled application.

20 Claims, 6 Drawing Sheets

(56) References Cited

U.S. PATENT DOCUMENTS

| | | | |
|---|---|---|---|
| 8,800,027 B1* | 8/2014 | Ackerman | H04L 9/321 |
| | | | 380/258 |
| 9,104,844 B2 | 8/2015 | Fang | |
| 9,122,848 B2 | 9/2015 | Jurkiewicz | |
| 9,374,379 B1* | 6/2016 | Hew | H04L 63/108 |
| 9,426,185 B1* | 8/2016 | Vora | H04L 63/0492 |
| 9,473,304 B1 | 10/2016 | Dixon | |
| 9,781,122 B1 | 10/2017 | Wilson | |
| 9,858,781 B1 | 1/2018 | Campero | |
| 9,953,168 B1* | 4/2018 | Lango | H04L 9/3268 |
| 10,218,690 B2 | 2/2019 | Helsen | |
| 10,455,011 B2 | 10/2019 | Kendall | |
| 10,467,385 B2 | 11/2019 | Ciszewski | |
| 10,559,003 B1* | 2/2020 | Bitoun | H04L 67/1095 |
| 10,601,829 B1 | 3/2020 | Nelson | |
| 10,673,628 B1 | 6/2020 | Shtop | |
| 10,719,503 B1 | 7/2020 | Bar Oz | |
| 10,742,638 B1* | 8/2020 | Fischer | H04L 63/0428 |
| 11,012,237 B1* | 5/2021 | Sarda | H04L 9/3247 |
| 11,025,626 B1 | 6/2021 | Todd | |
| 11,106,762 B1* | 8/2021 | DeMillo | G06F 21/105 |
| 11,159,338 B1* | 10/2021 | Roche | H04L 67/10 |
| 11,218,314 B2 | 1/2022 | Tan | |
| 11,233,802 B1 | 1/2022 | Rudeanu | |
| 11,522,864 B1 | 12/2022 | Gohil | |
| 11,544,356 B2 | 1/2023 | Huang | |
| 11,632,362 B1* | 4/2023 | Woodward | H04L 63/0876 |
| | | | 713/171 |
| 2003/0023724 A1* | 1/2003 | Martin | H04L 67/34 |
| | | | 709/225 |
| 2004/0010471 A1* | 1/2004 | Lenard | G06F 21/105 |
| | | | 705/59 |
| 2005/0078825 A1 | 4/2005 | Ohmori | |
| 2006/0155705 A1* | 7/2006 | Kamper | G06F 16/10 |
| 2009/0113543 A1 | 4/2009 | Adams | |
| 2010/0218237 A1* | 8/2010 | Ferris | H04L 65/4015 |
| | | | 726/4 |
| 2010/0293614 A1* | 11/2010 | Vilppola | G06F 21/52 |
| | | | 726/22 |
| 2012/0150785 A1* | 6/2012 | Subramanya | G06F 9/485 |
| | | | 706/46 |
| 2013/0047229 A1* | 2/2013 | Hoefel | G06F 21/121 |
| | | | 726/3 |
| 2013/0097596 A1* | 4/2013 | Queru | H04L 67/34 |
| | | | 717/176 |
| 2013/0144633 A1* | 6/2013 | Guadarrama | G06Q 30/06 |
| | | | 705/1.1 |
| 2013/0191884 A1 | 7/2013 | Leicher | |
| 2014/0123124 A1 | 5/2014 | Gray | |
| 2014/0189840 A1 | 7/2014 | Metke | |
| 2015/0082029 A1* | 3/2015 | Volchok | H04L 67/142 |
| | | | 713/164 |
| 2016/0087955 A1 | 3/2016 | Mohamad Abdul | |
| 2016/0094531 A1 | 3/2016 | Unnikrishnan | |
| 2016/0127352 A1 | 5/2016 | Xu | |
| 2016/0134599 A1 | 5/2016 | Ross | |
| 2016/0182314 A1* | 6/2016 | Will | H04L 41/0806 |
| | | | 709/226 |
| 2016/0337369 A1 | 11/2016 | Sanso | |
| 2017/0012980 A1* | 1/2017 | Sanso | H04L 63/10 |
| 2017/0034172 A1 | 2/2017 | Biggs | |
| 2017/0091474 A1* | 3/2017 | Boire-Lavigne | G06F 21/606 |
| 2017/0093827 A1* | 3/2017 | Pandian | H04L 63/102 |
| 2017/0118280 A1 | 4/2017 | Miyoshi | |
| 2017/0134937 A1* | 5/2017 | Miller | G06Q 20/3829 |
| 2017/0149755 A1 | 5/2017 | Soneda | |
| 2017/0201499 A1* | 7/2017 | McLaughlin | H04W 12/122 |
| 2017/0244695 A1 | 8/2017 | Lund | |
| 2017/0250971 A1 | 8/2017 | Gillespie | |
| 2017/0357784 A1 | 12/2017 | Duda | |
| 2018/0034858 A1 | 2/2018 | Gummaraju | |
| 2018/0041491 A1 | 2/2018 | Gupta | |
| 2018/0063118 A1* | 3/2018 | England | H04L 67/1097 |
| 2018/0077144 A1* | 3/2018 | Gangawane | H04L 63/102 |
| 2018/0083915 A1 | 3/2018 | Medam | |
| 2018/0083941 A1 | 3/2018 | Thakkar | |
| 2018/0083944 A1 | 3/2018 | Vats | |
| 2018/0167214 A1 | 6/2018 | Volchok | |
| 2018/0219846 A1 | 8/2018 | Poschel | |
| 2018/0219863 A1 | 8/2018 | Tran | |
| 2018/0278603 A1 | 9/2018 | Yabe | |
| 2018/0302406 A1 | 10/2018 | Burckhardt | |
| 2018/0316685 A1 | 11/2018 | Eberlein | |
| 2018/0367526 A1 | 12/2018 | Huang | |
| 2018/0367528 A1 | 12/2018 | Schwarz | |
| 2019/0007409 A1* | 1/2019 | Totale | H04L 63/029 |
| 2019/0028414 A1 | 1/2019 | Walker | |
| 2019/0065725 A1* | 2/2019 | Liderman | G06F 21/33 |
| 2019/0068568 A1* | 2/2019 | Liderman | H04L 9/3263 |
| 2019/0090174 A1* | 3/2019 | Rocci | H04W 48/02 |
| 2019/0108097 A1 | 4/2019 | Zhuang | |
| 2019/0149576 A1 | 5/2019 | Rajadurai | |
| 2019/0163912 A1* | 5/2019 | Kumar | H04L 9/0891 |
| 2019/0190912 A1 | 6/2019 | De Boer | |
| 2019/0205559 A1 | 7/2019 | Gupta | |
| 2019/0238467 A1* | 8/2019 | Guan | H04L 63/0227 |
| 2019/0278929 A1 | 9/2019 | Kakumani | |
| 2019/0303600 A1 | 10/2019 | Hamel | |
| 2019/0306138 A1 | 10/2019 | Carru | |
| 2019/0306157 A1* | 10/2019 | Lores | H04L 63/126 |
| 2019/0312857 A1 | 10/2019 | Lander | |
| 2019/0312887 A1 | 10/2019 | Grimm | |
| 2019/0327223 A1 | 10/2019 | Kumar | |
| 2019/0334884 A1 | 10/2019 | Ross | |
| 2019/0349426 A1 | 11/2019 | Smith | |
| 2019/0356478 A1 | 11/2019 | Young | |
| 2019/0356529 A1 | 11/2019 | Gulati | |
| 2019/0372960 A1 | 12/2019 | Huang | |
| 2019/0386831 A1* | 12/2019 | Jamkhedkar | H04L 9/3247 |
| 2019/0394041 A1 | 12/2019 | Jain | |
| 2020/0007524 A1* | 1/2020 | Kong | H04L 63/0853 |
| 2020/0007529 A1* | 1/2020 | Bahrenburg | H04L 63/08 |
| 2020/0053091 A1 | 2/2020 | Childress | |
| 2020/0059360 A1 | 2/2020 | Martynov | |
| 2020/0076797 A1* | 3/2020 | Mihara | H04L 63/0853 |
| 2020/0097972 A1* | 3/2020 | Karnik | G06Q 20/4014 |
| 2020/0125713 A1 | 4/2020 | Davis | |
| 2020/0150980 A1 | 5/2020 | Huang | |
| 2020/0220853 A1 | 7/2020 | Xu | |
| 2020/0257700 A1 | 8/2020 | Xu | |
| 2020/0280851 A1* | 9/2020 | Sethi | H04L 9/3268 |
| 2020/0287724 A1* | 9/2020 | Vaddi | H04L 9/0894 |
| 2020/0314211 A1 | 10/2020 | Oye | |
| 2020/0320178 A1* | 10/2020 | Gallagher | H04L 63/0884 |
| 2020/0380108 A1* | 12/2020 | Cypriano | G06F 21/33 |
| 2020/0409934 A1 | 12/2020 | Bar Oz | |
| 2020/0412708 A1* | 12/2020 | Oberoi | H04L 63/029 |
| 2021/0019062 A1* | 1/2021 | Fessel | G06F 3/0622 |
| 2021/0021609 A1 | 1/2021 | Smith | |
| 2021/0044634 A1 | 2/2021 | Hughes | |
| 2021/0089634 A1* | 3/2021 | Lakshminarayana | H04L 9/3236 |
| 2021/0099438 A1* | 4/2021 | Kurian | H04L 63/083 |
| 2021/0103461 A1* | 4/2021 | Esibov | G06F 9/5011 |
| 2021/0105254 A1 | 4/2021 | Walters | |
| 2021/0136063 A1* | 5/2021 | Cheek | H04W 12/12 |
| 2021/0218726 A1 | 7/2021 | Sundararajan | |
| 2021/0218742 A1 | 7/2021 | Cook | |
| 2021/0224300 A1* | 7/2021 | Rayner | G06F 16/9024 |
| 2021/0266306 A1 | 8/2021 | Furman | |
| 2021/0273931 A1 | 9/2021 | Murdoch | |
| 2021/0286861 A1 | 9/2021 | Churchill | |
| 2021/0328979 A1* | 10/2021 | M | H04L 9/3263 |
| 2021/0409223 A1* | 12/2021 | Subramanian | H04L 9/3213 |
| 2021/0409403 A1 | 12/2021 | Lewin | |
| 2022/0116393 A1 | 4/2022 | K | |
| 2022/0150066 A1* | 5/2022 | Sugarev | H04L 9/30 |
| 2022/0210141 A1 | 6/2022 | Parekh | |
| 2022/0247787 A1 | 8/2022 | Lippert | |
| 2022/0294788 A1 | 9/2022 | Pattar | |
| 2022/0321335 A1* | 10/2022 | Lum | G06F 21/6245 |

\* cited by examiner

SYSTEMS AND METHODS FOR USING JWTS FOR INFORMATION SECURITY

FIELD OF THE DISCLOSURE

The present disclosure relates to systems and methods for using JWTs for information security for one or more software-controlled applications.

BACKGROUND

Using password protection for authorization of access to software-controlled applications is known. Using JavaScript Object Notation (JSON) Web Tokens (JWTs) for certain communications between computing devices is known.

SUMMARY

One aspect of the present disclosure relates to a system configured for using JWTs for information security for a particular software-controlled application. As used herein, the term "software-controlled application" may refer to both (i) applications that are entirely software based, including but not limited to enterprise software, peer-to-peer software, and/or other types of software applications, and (ii) applications where a software component or a software layer is used to control a hardware application, including but not limited to code signing certificates, encrypted hard drives, security-enabled equipment, and/or other hardware applications that may be controlled by software. As used herein, the term "authorization credential" may refer to a license, such as a software license. The system may include electronic storage, one or more hardware processors configured by machine-readable instructions, and/or other components. The electronic storage is configured to store information electronically, including different types of client-provided information, hardware information, key information, and permission information. The one or more hardware processors are configured to provide individual JWTs that include individual expiration dates to individual users. The one or more hardware processors are configured to receive (regularly and/or at recurring intervals) a user request for continued access and/or use of the particular software-controlled application. The one or more hardware processors are configured to perform different types of (automated) verification based on the client-provided information in the user request. The one or more hardware processors are configured to, responsive to particular results from the different types of verification, perform some combination of transferring a response to the user request and accepting or denying continued access and/or use of the particular software-controlled application.

Another aspect of the present disclosure relates to a method for using JWTs for information security for a particular software-controlled application. The method includes storing information electronically, including different types of client-provided information, hardware information, key information, and permission information. The method includes providing individual JWTs that include individual expiration dates to individual users. The method includes receiving (regularly and/or at recurring intervals) a user request for continued access and/or use of the particular software-controlled application. The method includes performing different types of (automated) verification based on the client-provided information in the user request. The method may include, responsive to particular results from the different types of verification, performing some combination of transferring a response to the user request and accepting or denying continued access and/or use of the particular software-controlled application.

As used herein, any association (or relation, or reflection, or indication, or correspondency) involving servers, processors, client computing platforms, devices, JWTs, requests, different types of information, different types of verification, presentations, user interfaces, user interface elements, determinations, responses, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
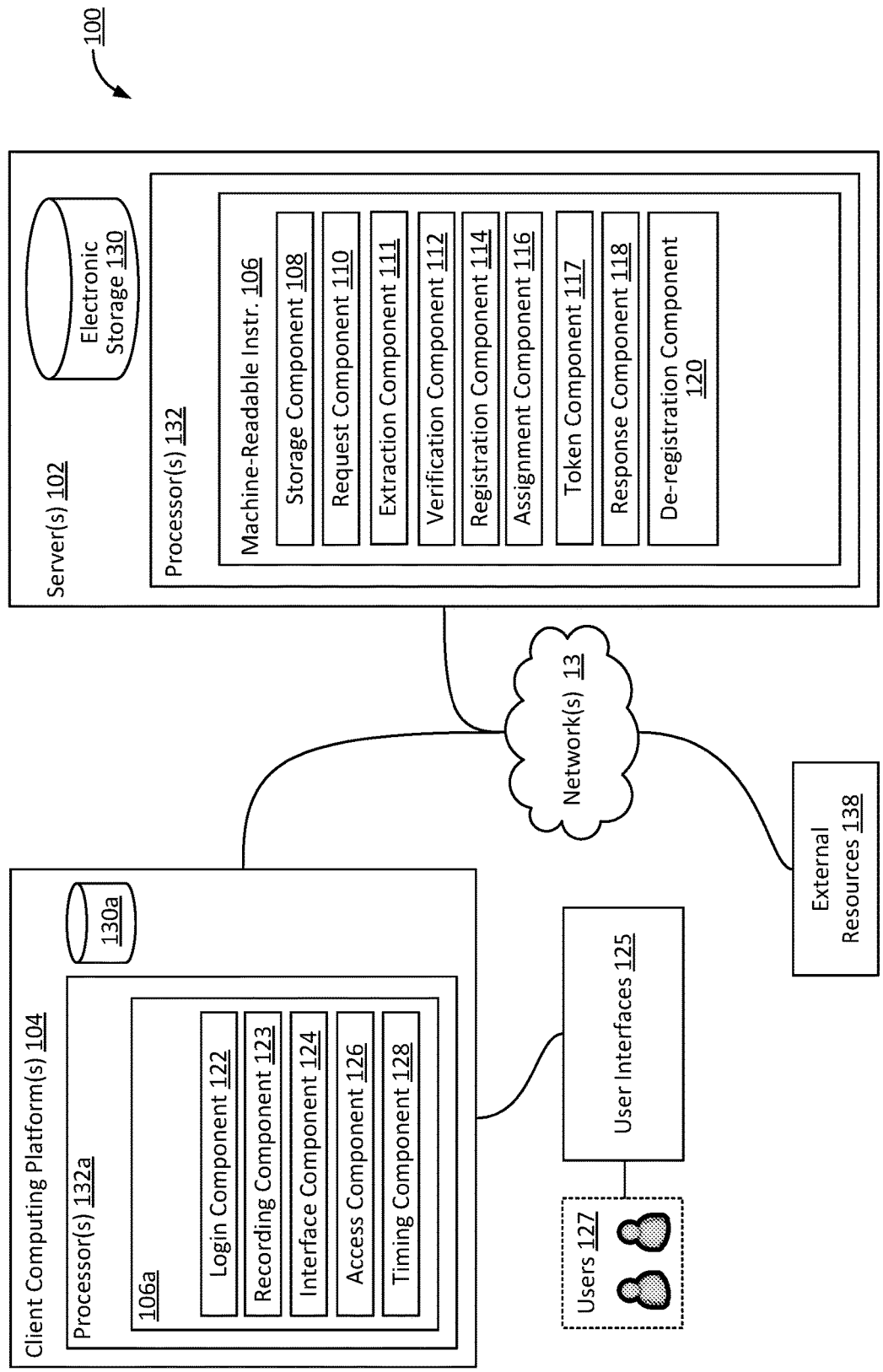
FIG. 1 illustrates a system configured for using JavaScript Object Notation (JSON) Web Tokens for information security for a particular software-controlled application, in accordance with one or more implementations.

FIG. 1 illustrates a system 100 configured for using JavaScript Object Notation (JSON) Web Tokens for information security for software-controlled applications, in accordance with one or more implementations. Users may provide JWTs regularly and/or at recurring intervals to authentication and authorization platforms 105 as part of user requests to request continued access and/or use of a particular software-controlled application. In some implementations, user requests may be referred to as (automated) client requests. Once a particular user has been granted access, using JWTs provides a repeated check for authentication and authorization, without requiring the particular user to repeatedly provide a user identifier and a password (or another type of authorization). As used herein, the term "information security" may refer to software license management.

In some implementations, system 100 may include one or more authentication and authorization platforms 105, one or more client computing platforms 104, one or more servers 102, electronic storage 130, one or more processors 132, one or more user interfaces 125, external resources 138, and/or other components. Authentication and authorization platforms 105 and server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 127 may access system 100 via client computing platform(s) 104. In some implementations, individual ones of users 127 may be associated with individual client computing platforms 104. For example, a first user may be associated with a first client computing platform 104, a second user may be associated with a second client computing platform 104, and so forth. In some implementations, individual user interfaces 125 may be associated with individual client computing platforms 104. For example, a first user interface 125 may be associated with a first client computing platform 104, a second user interface 125 may be associated with a second client computing platform 104, and so forth.

Server(s) 102 may be configured by machine-readable instructions 106. Machine-readable instructions 106 may include one or more instruction components. The instruction components may include computer program components. The instruction components may include one or more of a storage component 108, a request component 110, an extraction component 111, a verification component 112, a registration component 114, an assignment component 116, a token component 117, a response component 118, a de-registration component 120, a login component 122, a recording component 123, an interface component 124, an access component 126, a timing component 128, and/or other instruction components. Electronic storage 130a may be similar to electronic storage 130, though included in client computing platforms 104. Processors 132a may be similar to processors 132, though included in client computing platforms 104. Machine-readable instructions 106a may be similar to machine-readable instructions 106, though included in client computing platforms 104.

Storage component 108 may be configured to store information electronically, e.g., in electronic storage 130. In some implementations, stored information may be indexed, organized, structured, and/or otherwise searchable. For example, the stored information may include tables, databases, relational databases, and/or other types of structural data storage. In some implementations, the stored information may include user information that identifies a set of authorized users that are authorized to access and/or use one or more software-controlled applications. In some implementations, the stored information may include registered hardware information that identifies a set of registered client computing platforms that have been registered to access and/or use one or more software-controlled applications. In some implementations, the stored information may include registered key information that identifies a set of registered keys for encryption and/or decryption that have been registered to access and/or use one or more software-controlled applications. As used herein, the term "public key" may include public keys, private keys, and/or other keys used for encryption and/or decryption of information. In some implementations, the stored information may include revoked key information that identifies a set of revoked keys for encryption and/or decryption that are no longer registered to access and/or use one or more software-controlled applications. For example, in some implementations, individual ones of the set of revoked keys for encryption and/or decryption may correspond to previously-registered client computing platforms that have been reported stolen or missing. In some implementations, the stored information may include assigned permission information that identifies a set of assigned authorization credentials that have been assigned to specific users and specific client computing platforms. Individual ones of the set of authorization credentials may be associated with individual expiration dates. In some implementations, the stored information may include revoked permission information that identifies a set of revoked authorization credentials that are no longer assigned for access and/or use of one or more software-controlled applications. In some implementations, the stored information may include available permission information that identifies a set of available authorization credentials that are available to be assigned to a specific user and a specific client computing platform. In some implementations, the stored information may include information regarding previously issued JWTs and/or JWTs that have been previously used to request continued access and/or use of one or more particular software-controlled applications.

In some implementations, the stored information may include permission information regarding authorization credential pools. For example, a particular pool or set or number of authorization credentials may be designated for a particular group of users. As long as the particular pool is not exhausted and/or otherwise fully assigned to group members, another user from the group may automatically be authenticated and/or authorized by system 100 such that an available authorization credential is assigned to this user. In some implementations, upon an authorization credential being newly assigned to a particular user, a new JWT may be created and provided to this particular user, to be used for future requests for continued access and/or use of a particular software-controlled application. Individual JWTs may include a header, a payload, a (digital) signature, and/or other information. The signature securely validates a JWT, and the integrity of the information in the payload. In some implementations, individual JWTs use one or both of JSON Web Signature and JSON Web Encryption.

Request component 110 may be configured to receive requests from users 127. The requests may include login requests, user requests, (automated) client requests, and/or other requests. In some implementations, a login request may request user-specific authentication to access and/or use a particular software-controlled application. Alternatively, and/or simultaneously, in some implementations, a login request may request device-specific authorization to access and/or use a particular software-controlled application. In some implementations, individual login requests may be both user-specific and device-specific.

In some implementations, a user request may request continued access and/or use a particular software-controlled application. In some implementations, a user request may request user-specific authentication for continued access and/or use a particular software-controlled application. Alternatively, and/or simultaneously, in some implementations, a user request may request device-specific authorization for continued access and/or use a particular software-controlled application. In some implementations, individual user requests may be both user-specific and device-specific.

In some implementations, requests may include one or more of a user identifier that identifies a user, a hardware identifier that identifies a particular client computing platform 104, a machine identifier that identifies a particular public key, and/or other information. For example, in some implementations, a request may include a password that is provided by the user. For example, in some implementations, a request may include a device name that identifies a particular client computing platform 104 (e.g., that is currently being used by the user to provide the request). In some implementations, requests may include client-provided information, including but not limited to client-provided JWTs, client-provided expiration dates, client-provided machine identifiers, client-provided hardware identifiers, and/or other client-provided information. In some implementations, some or all of the client-provided information may be included in the payload of a client-provided JWT. As used herein, the term "client-provided" may refer to information extracted by client-side software, or retrieved by client-side software, and/or otherwise provided by a client computing platform, on behalf of a user of a client computing platform, and/or by a user of a client computing platform.

In some implementations, hardware identifiers may be added to and/or provided by individual client computing platforms 104 as part of a request. For example, a hardware identifier may be a Media Access Control (MAC) address, which may be supplied and/or otherwise provided by an individual client device. In some implementations, hardware identifiers may be a machine name, or may include a machine name, or may be a combination of a MAC address and a machine name.

In some implementations, machine identifiers may identify a public key used for Public Key Infrastructure (PKI). In some implementations, a particular machine identifier may be (or include) a textual representation of a public key and/or another (generated) certificate. In some implementations, a particular machine identifier may be (or include) a textual representation of a device fingerprint or machine fingerprint. For example, the particular machine identifier may include information about the specific hardware and/or software of a particular device. In some implementations, a machine identifier may be created by hashing a certificate and/or public key.

Extraction component 111 may be configured to extract information from requests and/or JWTs. For example, extraction component 111 may extract one or more of a client-provided hardware identifier, a client-provided machine identifier, a client-provided user identifier, a client-provided expiration date, and/or other information from a particular request or JWT. For example, extraction component 111 may extract information from the payload of a particular (client-provided) JWT.

Verification component 112 may be configured to perform different types of verifications. Verifications may be performed in response to (or subsequent to) receiving particular requests, including login requests and user requests. Verifications may be based on information included in particular requests, including but not limited to user identifiers, hardware identifiers, machine identifiers, JWTs, and/or other (client-provided) information. The different types of verifications may include one or more of user-identifier verifications, hardware-identifier verifications, machine-identifier verifications, machine-revocation verifications, assignment verifications, authorization credential-revocation verifications, expiration verifications, authorization credential-availability verifications, token-validation verifications, and/or other types of verifications. In some implementations, a subset of these different types of verifications may be used to verify automatically whether a particular authorization credential has been assigned to a particular user. Alternatively, and/or simultaneously, in some implementations, a subset of these different types of verifications may be used to automatically assign an available authorization credential (e.g., from an authorization credential pool) to a particular user. Alternatively, and/or simultaneously, in some implementations, a subset of these different types of verifications may be used to accommodate an existing user requesting access to a particular software-controlled application using a new device (e.g., if an authorization credential was previously assigned to the existing user for a different device). Alternatively, and/or simultaneously, in some implementations, a subset of these different types of verifications may be used to handle a stolen, missing, or defective device (e.g., to ensure a previously assigned authorization credential is revoked so the old device will not have access to a particular software-controlled application and/or will not continue to use an authorization credential that might otherwise be available). Alternatively, and/or simultaneously, in some implementations, a subset of these different types of verifications may be used to accommodate an existing user requesting continued access and/or use of a particular software-controlled application.

In some implementations, user-identifier verifications may be performed by verification component 112 to verify whether a particular user identifier (e.g., the user identifier in a particular login request) corresponds to one of the user identifiers in the set of authorized users (e.g., as included in the stored information). In some implementations, one or more types of verifications may be performed by comparisons between different items of information. For example, user-identifier verification may be performed by comparing the particular user identifier with each of the authorized users in the stored information.

In some implementations, hardware-identifier verifications may be performed by verification component 112 to verify whether a particular hardware identifier (e.g., the hardware identifier provided in a particular request) corresponds to one of the hardware identifiers in the set of registered client computing platforms (e.g., as included in the stored information). In some implementations, verification may include comparisons and/or look-ups of stored information.

In some implementations, machine-identifier verifications may be performed by verification component 112 to verify whether a particular machine identifier (e.g., the machine identifier provided in a particular request) corresponds to one of the machine identifiers in the set of registered keys for encryption and/or decryption (e.g., as included in the stored information).

In some implementations, machine-revocation verifications may be performed by verification component 112 to verify whether a particular machine identifier (e.g., the machine identifier provided in a particular request) corresponds to one of the machine identifiers in the set of revoked keys for encryption and/or decryption (e.g., as included in the stored information).

In some implementations, assignment verifications may be performed by verification component 112 to verify whether a particular authorization credential (e.g., the authorization credential associated with a client-provided hardware identifier and a client-provided machine identifier in a particular request) corresponds to one of the authorization credentials in the set of assigned authorization credentials (e.g., as included in the stored information).

In some implementations, authorization credential-revocation verifications may be performed by verification component 112 to verify whether a particular authorization credential (e.g., the authorization credential associated with a client-provided hardware identifier and a client-provided machine identifier in a particular request) corresponds to one of the authorization credentials in the set of revoked authorization credentials (e.g., as may be included in the stored information). In some implementations, authorization credential-revocation verifications may be performed by verification component 112 to verify whether a particular authorization credential (e.g., the authorization credential associated with a client-provided hardware identifier and a client-provided machine identifier in a particular request) corresponds to one of the authorization credentials in a set of authorization credentials that are no longer assigned (or authorized) for access and/or use of a particular software-controlled application.

In some implementations, expiration verifications may be performed by verification component 112 to verify whether particular authorization credentials and/or JWTs have expired. In some implementations, expiration may be based on individual expiration dates that are associated with individual authorization credentials. Expiration dates may be included in the stored information. In some implementations, expiration may be based on individual expiration dates that are associated with individual JWTs. For example, expiration dates may be included in the payload of a client-provided JWT.

In some implementations, authorization credential-availability verifications may be performed by verification component 112 to verify whether the set of available authorization credentials includes an individual available authorization credential (e.g., that is currently available, or that is available in view of certain context such as identifiers and/or other information). For example, in some implementations, an authorization credential may be available provided that it is unassigned, unrevoked, and available to be assigned to a particular user. In some implementations, availability may be determined in view of an authorization credential pool. For example, a particular group of users may use an authorization credential pool that includes a particular number of authorization credentials such that there may only be an available authorization credential if less than the number of authorization credentials in the pool is currently assigned to the group of users that use the authorization credential pool.

In some implementations, token-validation verifications may be performed by verification component 112 to verify whether a particular client-provided JWT is valid (e.g., the client-provided JWT in a user request for continued access and/or use of a particular software-controlled application). For example, token-validation verification may include verifying whether the individual signature of an individual JWT is correct and validates the individual JWT.

In some implementations, particular verifications may be performed in response to (or subsequent to) one or more other verifications. For example, the assignment verification may be performed responsive to the token-validation verification verifying that the client-provided JWT is valid. For example, the expiration verification may be performed responsive to the assignment verification verifying a particular authorization credential corresponds to one of the set of assigned authorization credentials, wherein the particular authorization credential is associated with both the client-provided hardware identifier and the client-provided machine identifier. For example, the machine-revocation verification may be performed responsive to the expiration verification verifying the particular authorization credential has not expired. These examples are not intended to be limiting.

Registration component 114 may be configured to register one or more of a specific user (or user identifier), a specific client computing platform (or hardware identifier), a specific public key (or machine identifier), and/or other information. In some implementations, registration may include adding particular information to a particular set, table, database, and/or other type of stored information. For example, registration of particular hardware information may include adding the particular hardware information to the set of registered hardware information (e.g., as may be included in the stored information). For example, registration of particular machine information may include adding the particular machine information to the set of registered key information (e.g., as may be included in the stored information). In some implementations, registrations by registration component 114 may be performed in response to (or subsequent to) one or more verifications by verification component 112, or other actions by system 100. For example, responsive to the machine-identifier verification failing to verify that the machine identifier in a particular request corresponds to one of the set of registered keys for encryption and/or decryption, registration component 114 may be configured to register the machine identifier.

Assignment component 116 may be configured to assign a specific authorization credential (e.g., an individual available authorization credential) to a specific user and a specific client computing platform. In some implementations, assignment of an authorization credential may be specific to a machine identifier. In some implementations, assignment may include adding particular information to a particular set, table, database, and/or other type of stored information. For example, assignment of a particular authorization credential may include adding the particular authorization credential (and/or information regarding the particular authorization credential) to the set of assigned authorization credentials (e.g., as may be included in the stored information). In some implementations, assignments by assignment component 116 may be performed in response to (or subsequent to) one or more verifications by verification component 112, or other actions by system 100. For example, responsive to the authorization credential-availability verification verifying that the set of available authorization credentials includes an individual available authorization credential, assignment component 116 may be configured to assign the individual available authorization credential to the user such that the set of assigned authorization credentials includes the individual available authorization credential. In some implementations, assignment of a particular authorization credential includes associating the particular authorization credential with a particular hardware identifier and a particular machine identifier, such that the particular hardware identifier is associated with the particular machine identifier and vice versa. In some implementations, upon an authorization credential being newly assigned to a particular user by assignment component 116, a new JWT may be created (e.g., by token component 117) and provided (e.g., by response component 118 and/or another component of system 100) to this particular user. This particular user may use this new JWT for requests for continued access and/or use of a particular software-controlled application.

Token component 117 may be configured to create and/or renew JWTs. Token creation may include combining different types of information, including but not limited to one or more of a user identifier, a hardware identifier, a machine identifier, a public key, permission information, an expiration date, a selection for an algorithm to be used to generate a digital signature, and/or other information. In some implementations, token creation may include encoding of one or more of the different types of information. For example, JWTs may use encoding that is the same as or similar to base64 encoding. In some implementations, token creation may include encryption of one or more of the different types of information. For example, JWTs may use encryption that is the same as or similar to SHA-256 and/or HMAC. In some implementations, renewal of a token may include reusing the same information as another JWT, but with a different expiration date that is later than the original expiration date in the other JWT. In some cases, system 100 may respond to every user request (that passes the different types of verifications by verification component 112) by providing a renewed JWT, such that an individual JWT will only be used once to request continued access and/or use of the particular software-controlled application. In these cases, system 100 may verify that a client-provided JWT has not been provided previously. In other words, a JWT cannot be replayed in such a case. In other cases, system 100 may respond to only some user requests (that passes the different types of verifications by verification component 112) by providing a renewed JWT, for example when expiration is imminent.

Response component 118 may be configured to transfer responses to requests, including login requests and user requests. In some implementations, individual responses may include JWTs (e.g., provided to the user that made the request). Alternatively, and/or simultaneously, individual responses may include individual standard HyperText Transfer Protocol (HTTP) status codes. In particular, responses may conform to the HTTP application layer protocol. For example, an individual standard HTTP status code may be "200", "201", "401", "402", "403", "404", "410", and/or other standard HTTP status codes. For example, a "200" status code may indicate a request has been accepted. For example, a "201" status code may indicate a request has been accepted, and a new resource has been created in the process. For example, a "401" status code may indicate the request has not been accepted due to some (client) error. For example, a "402" status code may indicate the request has not been accepted due to some (client) error that requires a payment. For example, a "403" status code may indicate the request has not been accepted due to some (client) error that represents the client has no access, or no longer has access. For example, a "410" status code may indicate the request has not been accepted due to some (client) error that represents a removal or revocation of rights. In some implementations, individual responses may include or use so-called "raw sockets". In some implementations, individual responses may conform to Quick UDP Internet Connections (QUIC). Other protocols and formats are considered within the scope of this disclosure. In some implementations, responses by response component 118 may be performed in response to (or subsequent to) one or more verifications by verification component 112, registrations by registration component 114, assignments by assignment component 116, token creations (or renewals) by token component 117, or other actions by system 100.

Referring to FIG. 1, de-registration component 120 may be configured to de-register a particular hardware identifier, e.g., by removing the particular hardware identifier from the set of registered client computing platforms. In some implementations, de-registration component 120 may be configured to move a previously assigned authorization credential. For example, an authorization credential may be moved from one client computing platform to another client computing platform. In some implementations, de-registration component 120 may be configured to re-assign a previously assigned authorization credential to another combination of client computing platform (or hardware identifier) and/or public key (or machine identifier). For example, a re-assignment may be accomplished by modifying at least one of the set of registered client computing platforms, the set of registered keys for encryption and/or decryption, the set of assigned authorization credentials, and/or the set of revoked authorization credentials.

Recording component 123 may be configured to store information in electronic storage 130a. The stored information may include one or more JWTs received from authentication and authorization platform 105, timestamps (e.g., when a JWT has been received, when particular responses are received, or when other events occurred), and/or other information. In some implementations, the stored information may include a hardware identifier, a machine identifier, and/or other information that is specific to a user and/or a device.

Referring to FIG. 1, login component 122 may be configured to receive user input (from users 127) on client computing platforms 104. For example, the user input may represent a particular (login) request, by a particular user, to access and/or use a particular software-controlled application. Login component 122 may be configured to provide requests to authentication and authorization platform 105 (and, in particular, to request component 110). Responses from authentication and authorization platform 105 (and, in particular, from response component 118) may be provided to client computing platforms 104 (and, in particular, to login component 122). In some implementations, user input received by login component 122 may include a user identifier, a password, and/or other information. In some implementations, login component 122 may be configured to add certain information to the received user input to form requests, including but not limited to a hardware identifier, a machine identifier, and/or other information. For example, this information may be available locally on the particular client computing platform 104. In some implementations, login component 122 may (regularly and/or at recurring intervals) automatically provide (e.g., to authentication and authorization platform 105) user requests that request continued access and/or use of the particular software-controlled application. These user requests may include the JWT that is locally stored in electronic storage 130a. These intervals may be an hour, a day, a week, 2 weeks, a month, and/or another duration. Certain responses received from authentication and authorization platform 105 may prompt recording component 123 to record and/or store a new timestamp, which may reset the predetermined grace period.

Referring to FIG. 1, interface component 124 may be configured to generate, effectuate, and/or present user interfaces 125 on client computing platforms 104 to users. For example, interface component 124 may be configured to present a particular user interface 125 on a particular client computing platform 104 to a particular user. For example, particular user interface 125 may include one or more portions or sections. The one or more portions and/or sections may include a first portion, a second portion, a third portion, a fourth portion, and so forth. In some implementations, a portion of a particular user interface 125 may enable a user to enter and/or select information and/or actions, including but not limited to a particular user identifier, a particular password, and a graphical user interface element to transfer a user request to authentication and authorization platform 105. In some implementations, a portion of particular user interface 125 may be used to present a response to the user (e.g., from response component 118).

Access component 126 may be configured to provide or deny access to software-controlled applications. For example, assume that a particular user is using a particular client computing platform to (try to) access a particular software-controlled application. Upon acceptance of a particular request from the particular user (such that a particular authorization credential is assigned or has been assigned to the particular user) access component 126 may enable the particular user to use the particular software-controlled application. In some implementations, the particular software-controlled application may be executed locally, on the particular client computing platform that is associated with and/or being used by the particular user. In some implementations, the particular software-controlled application may be executed on a server (e.g., on authentication and authorization platform 105 or on external resources 138), such that pertinent information regarding the particular software-controlled application is made available and/or otherwise presented on the particular client computing platform that is associated with and/or being used by the particular user. Based on the particular responses from authentication and authorization platform 105, continued access and/or use of the particular software-controlled application may be either provided (or approved) or denied.

Timing component 128 may be configured to determine amounts of elapsed time. In some implementations, timing component 128 may determine an amount of elapsed time between the most recently stored timestamp (e.g., when a new JWT or a particular response was received from authentication and authorization platform 105) and a particular moment in time. The particular moment in time could be the current time. The particular moment in time could be the moment a particular response was received, e.g., with a particular standard HTTP status code. For example, the particular moment could be the moment a standard HTTP status code of "402" was received. Timing component 128 may be configured to compare amounts of elapsed time (as previously determined) with a threshold duration referred to as a predetermined grace period. In some cases, the predetermined grace period may be 1 day, 1 week, 1 month, and/or another duration. Access component 126 may deny continued access to the particular software-controlled application responsive to the amount of elapsed time exceeding the predetermined grace period. In other words, once a user is no longer entitled to access to the particular software-controlled application (due to the expiration date passing), the predetermined grace period allows continued access for a limited time (i.e., for the predetermined grace period) until continued access will be denied. During that period, the user can remedy the passing of the expiration date, e.g., by purchasing extended access to the particular software-controlled application, or by otherwise renewing the user's authorization credential to the particular software-controlled application. For example, a user request after renewal of the authorization credential would return a particular response (e.g., a standard HTTP status code of 200 and/or 201), which would cause recording component 123 to store a new timestamp, thus resetting the predetermined grace period. In some implementations, the time between individual ones of the recurring intervals (when login component 122 automatically provides user requests to authentication and authorization platform 105) may be shorter than the predetermined grace period.

Figure 3:
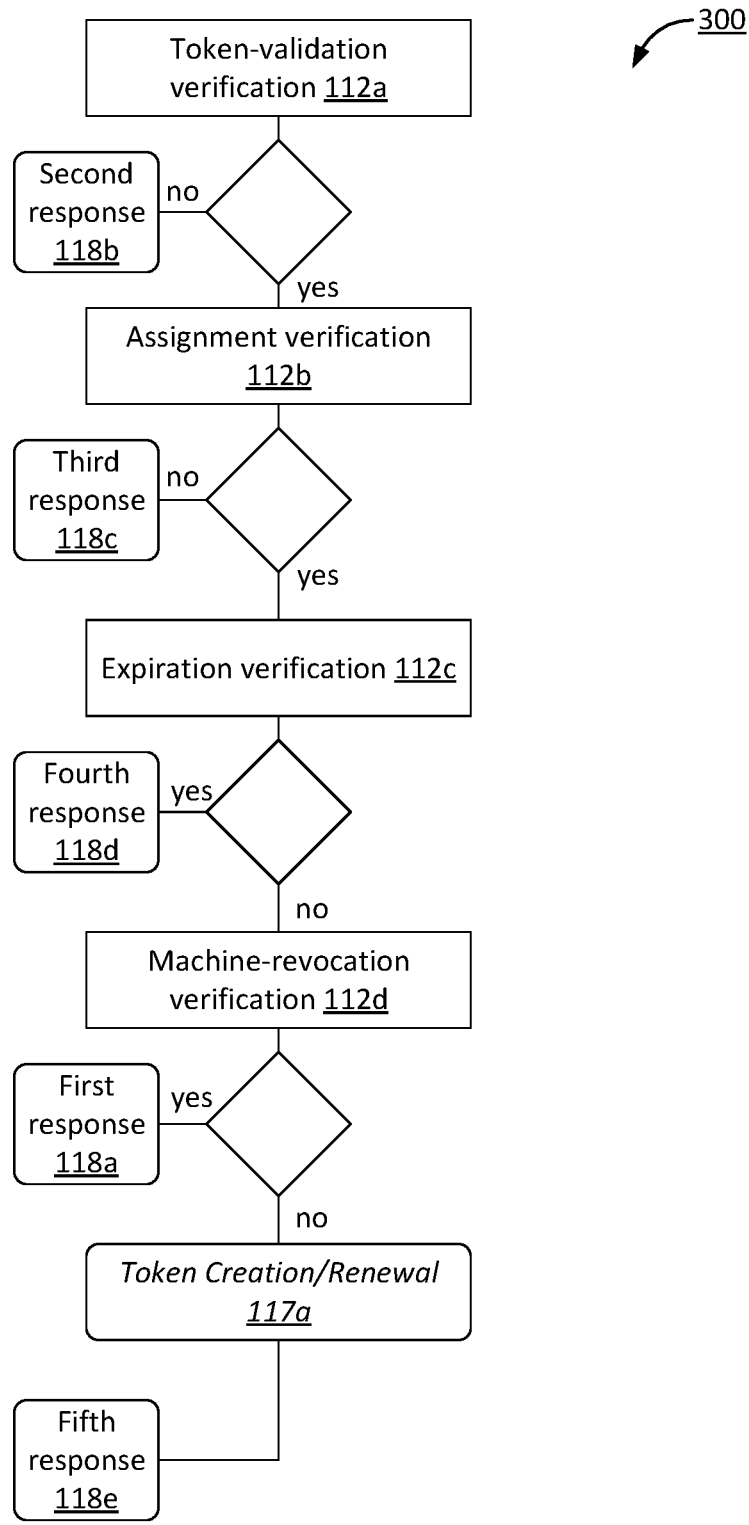
FIGS. 3-4-5 illustrates exemplary flow charts as may be used in a system configured for using JavaScript Object Notation (JSON) Web Tokens for information security for a particular software-controlled application, in accordance with one or more implementations.

By way of non-limiting example, FIG. 3 illustrates an exemplary flow chart 300 as may be used in system 100 (in particular, by authentication and authorization platform 105). Flow chart 300 may start at token-validation verification 112a, and further include some or all of the following other types of verification, which may be linked together as depicted in FIG. 3: assignment verification 112b, expiration verification 112c, and machine-revocation verification 112d. Based on the results of these different types of verifications, flow chart 300 may perform some or all of the following actions: provide a response (e.g., first response 118a, second response 18b, third response 118c, fourth response 118d, or fifth response 118e), and token creation/renewal 117a. Individual responses may include individual standard HTTP status codes. For example, first response 118a may indicate a user request cannot be fulfilled due to error. For example, second response 118b may indicate a user request cannot be fulfilled due to error. For example, third response 118c may indicate a user request cannot be fulfilled due to error. For example, fourth response 118d may indicate a user request cannot be fulfilled due to error. For example, fifth response 118e may indicate a user request has been accepted for continued access and/or use of the particular software-controlled application.

Figure 4:
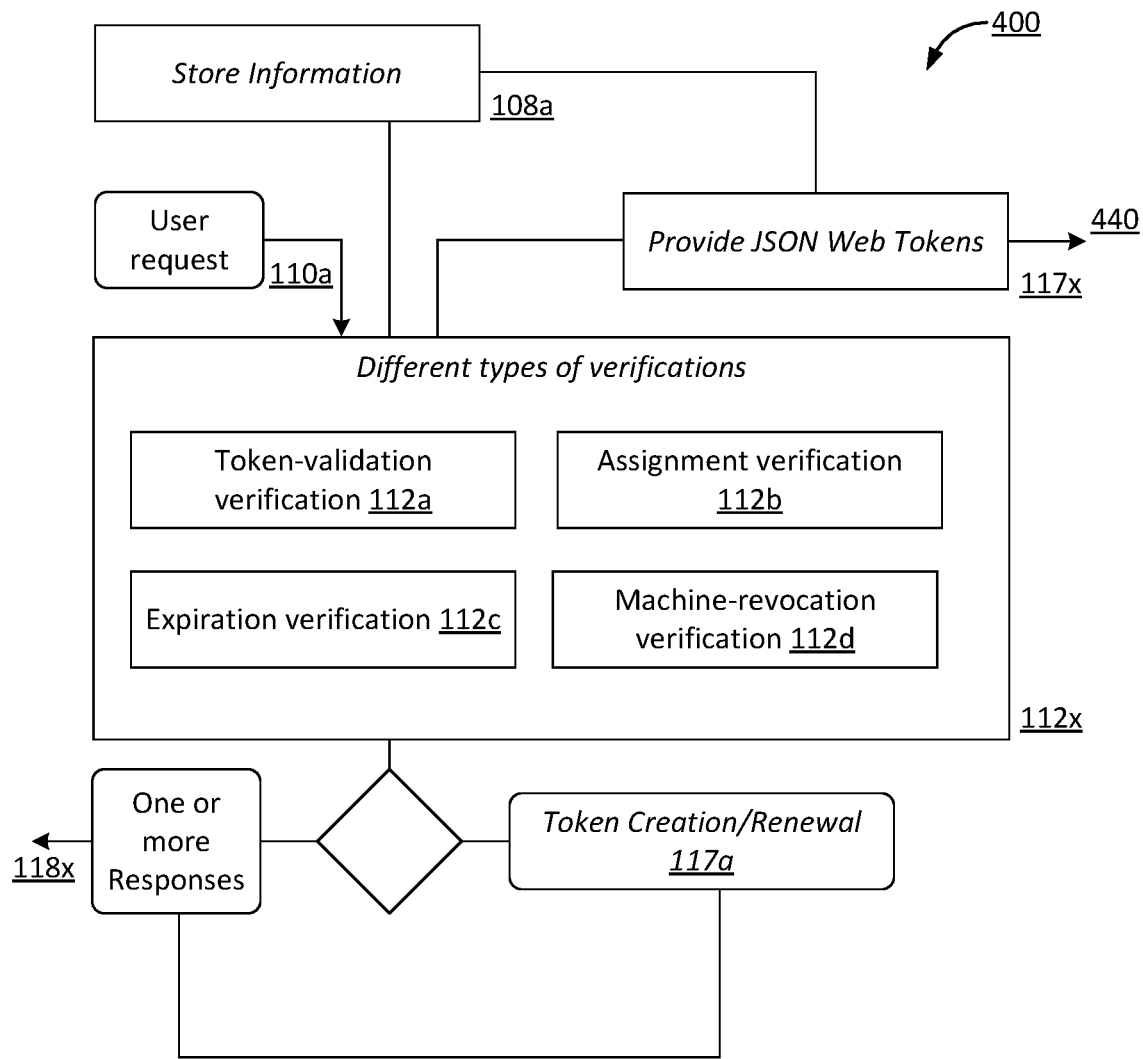

By way of non-limiting example, FIG. 4 illustrates an exemplary flow chart 400 as may be used in system 100 (in particular, by authentication and authorization platform 105). Flow chart 400 may start at a step labeled "Store Information" 108a (which stores information in an electronic storage regarding identifiers, authorization credentials, and JWTs as described in this disclosure), upon which a step labeled "Provide JWTs" 117x may be based (which provides individual JWTs 440 to individual users, outside of flowchart 400, e.g., upon assigning an authorization credential to the individual users, though this assignment is not depicted in FIG. 4). Flow chart 400 may include a step labeled "User request" 110a, where a user provides a user request to request continued access and/or use of a particular software-controlled application. Flow chart 400 may subsequently include some or all of the following other types of verification, which may be organized as depicted in FIG. 4 under a step labeled "Different types of verifications" 112x: token-validation verification 112a, assignment verification 112b, expiration verification 112c, and machine-revocation verification 112d. Based on the results of these different types of verifications, flow chart 400 may perform some or all of the following actions: provide "One or more Responses" 118x, and "Token Creation/Renewal" 117a. Individual responses may include individual standard HTTP status codes. In some cases, a response may include a JWT.

Figure 5:
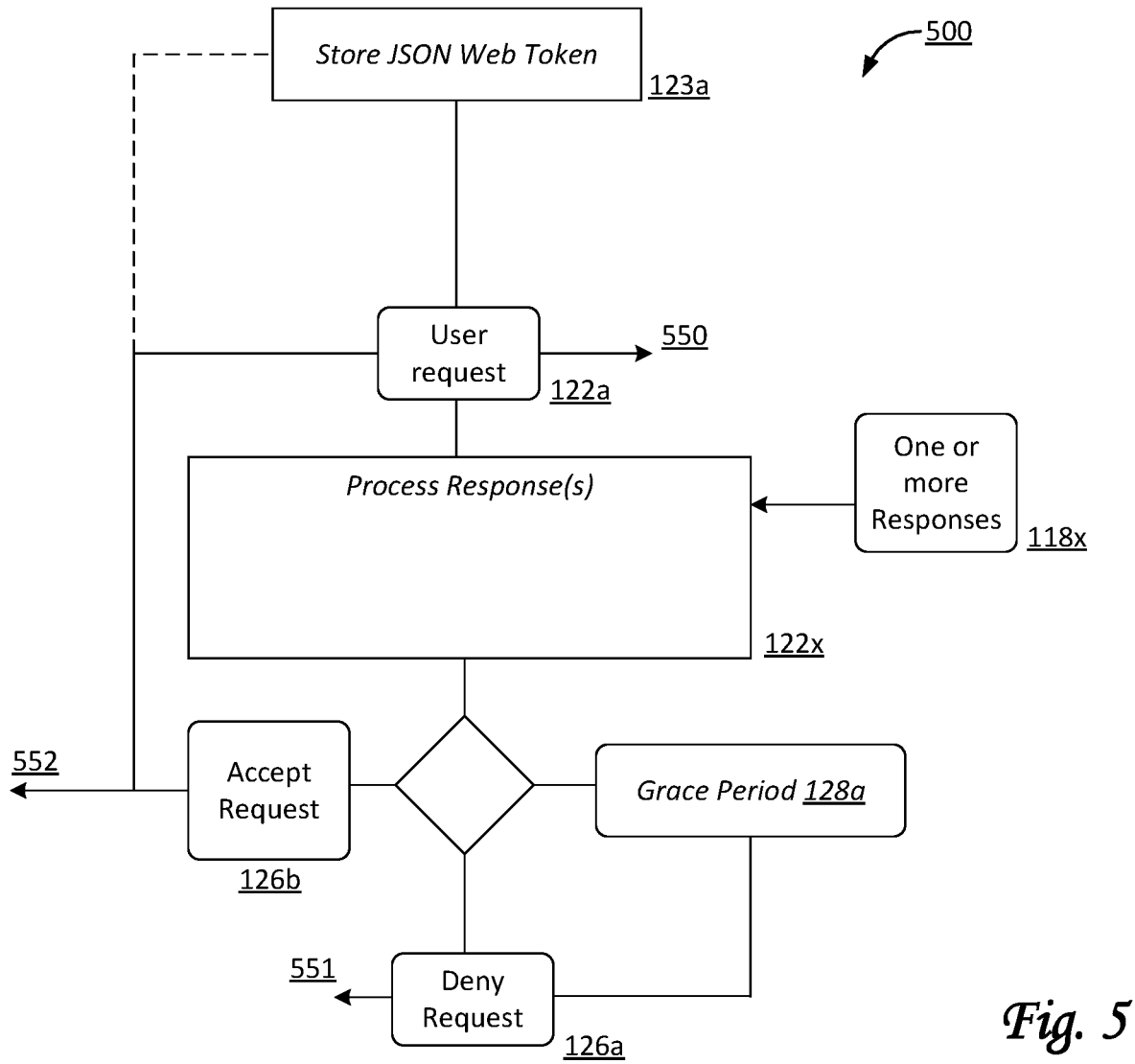

By way of non-limiting example, FIG. 5 illustrates an exemplary flow chart 500 as may be used in system 100 (in particular, by a particular client computing platform 104). Flow chart 500 may start at a step labeled "User request" 122*a*, where the user of the particular client computing platform 104 provides a user request, via a transfer of information 550, to request continued access and/or use of a particular software-controlled application. This user request includes the locally stored JWT (stored in step 123*a*, labeled "Store JWT"), and is provided, via transfer of information 550, to authentication and authorization platform 105 (not depicted). In response, authentication and authorization platform 105 (not depicted) provides one or more responses, as indicated by step 118*x*. Subsequently, flow chart 500 includes a step labeled "Process Response(s)" 122*x*. Based on the particular response received, flow chart 500 may continue at a step labeled "Deny Request" 126*a* (by providing particular information 551 to the user, e.g., regarding the reason a user request is being denied), which means the user will no longer have access to the particular software-controlled application. Alternatively, flow chart 500 may continue at a step labeled "Accept Request" 126*b*, which means the user may continue using the particular software-controlled application (by providing particular information 552 to the user, e.g., regarding the reason a user request is accepted and/or from the particular software-controlled application). Alternatively, flow chart 500 may continue at a step labeled "Grace Period" 128*a*, which means the user is allowed continued access for a limited time (i.e., for the predetermined grace period) until access will be denied, unless the user remedies the passing of the expiration date. In some cases, flow chart 500 may return, after allowing the user continued access to start anew (e.g., after a recurring interval has passed), either by step 123*a* or step 122*a*.

Figure 6:
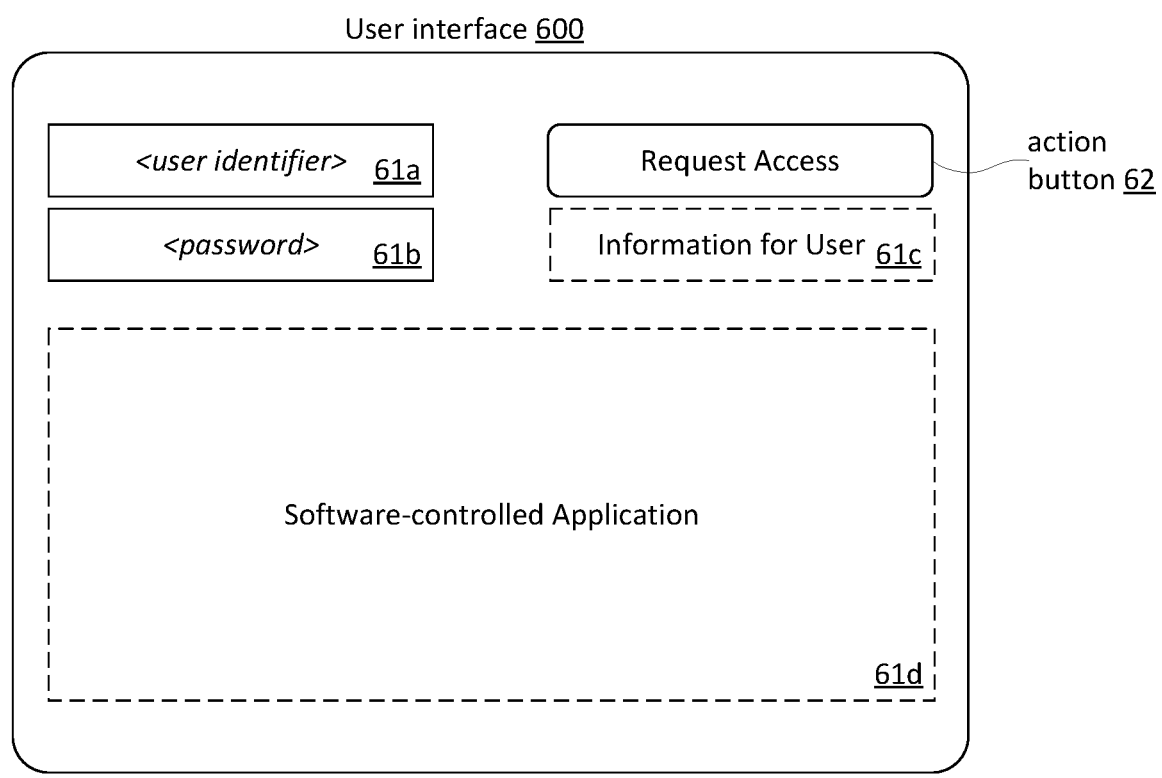
FIG. 6 illustrates an exemplary user interface as may be provided to users of a system configured for using JavaScript Object Notation (JSON) Web Tokens for information security for a particular software-controlled application, in accordance with one or more implementations.

By way of non-limiting example, FIG. 6 illustrates an exemplary user interface 600 as may be present to a user on a particular client computing platform. User interface 600 may include graphical user interface elements 61*a* and 61*b* that are configured for a user to enter and/or select information. For example, element 61*a* may be used to enter a user identifier and element 61*b* may be used to enter a password. User interface 600 may include an action button 62 labeled "Request Access". Upon selection and/or engagement of action button 62, user interface 600 may initiate and/or otherwise provide a particular request to authentication and authorization platform 105. A first request may be a login request to a particular software-controlled application, based on the entered user identifier and password. Subsequent (automated) requests may be requests for continued access and/or use of the particular software-controlled application, based on a locally (i.e., on the particular client computing platform) stored JWT. User interface 600 may include graphical user interface element 61*c*, labeled "Information for User", which may be used by the system to provide information to the user, including but not limited to feedback, comments, or prompts. For example, a client-side application may interpret responses from authentication and authorization platform 105 (including but not limited to standard HTTP status codes) and provide information to the user, through graphical user interface element 61*c*, that is based on the responses from authentication and authorization platform 105. For example, responsive to a particular request for continued access and/or use of the particular software-controlled application being denied, graphical user interface element 61*c* may provide an explanation or reason why the particular request is denied and/or information about how to remedy the issue so that access and/or use may be resumed. User interface 600 may include graphical user interface element 61*d*, labeled "Software-controlled application", which may be used by the system to provide (continued) access to the particular software-controlled application as requested by the user, and which may be used to deny access if the request is denied.

In some implementations, authentication and authorization platform(s) 105, server(s) 102, client computing platform(s) 104, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which components may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 125 may be configured to facilitate interaction between users and system 100 and/or between users and client computing platforms 104. For example, user interfaces 125 may provide an interface through which users may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, sensors to capture facial characteristics, biometric sensors, and/or other user interface devices configured to receive and/or convey user input and/or information from a user. In some implementations, user interface 125 may be configured to support face recognition, iris recognition, RFID implants, and/or other personalization technologies. In some implementations, one or more user interfaces 125 may be included in one or more client computing platforms 104. In some implementations, one or more user interfaces 125 may be included in system 100.

External resources 138 may include sources of information outside of system 100, external entities participating with system 100, and/or other resources. In some implementations, external resources 138 may include a provider of information which may be used by system 100. In some implementations, external resources 138 may include a provider of particular software-controlled applications which may be made available to users through system 100. In some implementations, some or all of the functionality attributed herein to external resources 138 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable or capable of being coupled operationally to server(s) 102 via, for example, a port (e.g., a USB port, a firewire port, etc.) or a drive (e.g., a disk drive, etc.) or networked storage (e.g., network-attached storage (NAS), storage area network (SAN), etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information, whether local or remote, or both. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 111, 112, 114, 116, 117, 118, 120, 122, 123, 124, 126, and/or 128, and/or other components. Processor(s) 132 may be configured to execute components 108, 110, 111, 112, 114, 116, 117, 118, 120, 122, 123, 124, 126, and/or 128, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 111, 112, 114, 116, 117, 118, 120, 122, 123, 124, 126, and/or 128 are illustrated in FIG. 1 as being implemented within a single processing unit, in implementations in which processor(s) 132 includes multiple processing units, one or more of components 108, 110, 111, 112, 114, 116, 117, 118, 120, 122, 123, 124, 126, and/or 128 may be implemented remotely from the other components. The description of the functionality provided by the different components 108, 110, 111, 112, 114, 116, 117, 118, 120, 122, 123, 124, 126, and/or 128 described below is for illustrative purposes, and is not intended to be limiting, as any of components 108, 110, 111, 112, 114, 116, 117, 118, 120, 122, 123, 124, 126, and/or 128 may provide more or less functionality than is described. For example, one or more of components 108, 110, 111, 112, 114, 116, 117, 118, 120, 122, 123, 124, 126, and/or 128 may be eliminated, and some or all of its functionality may be provided by other ones of components 108, 110, 111, 112, 114, 116, 117, 118, 120, 122, 123, 124, 126, and/or 128. As another example, processor(s) 132 may be configured to execute one or more additional components that may perform some or all of the functionality attributed below to one of components 108, 110, 111, 112, 114, 116, 117, 118, 120, 122, 123, 124, 126, and/or 128.

Figure 2:
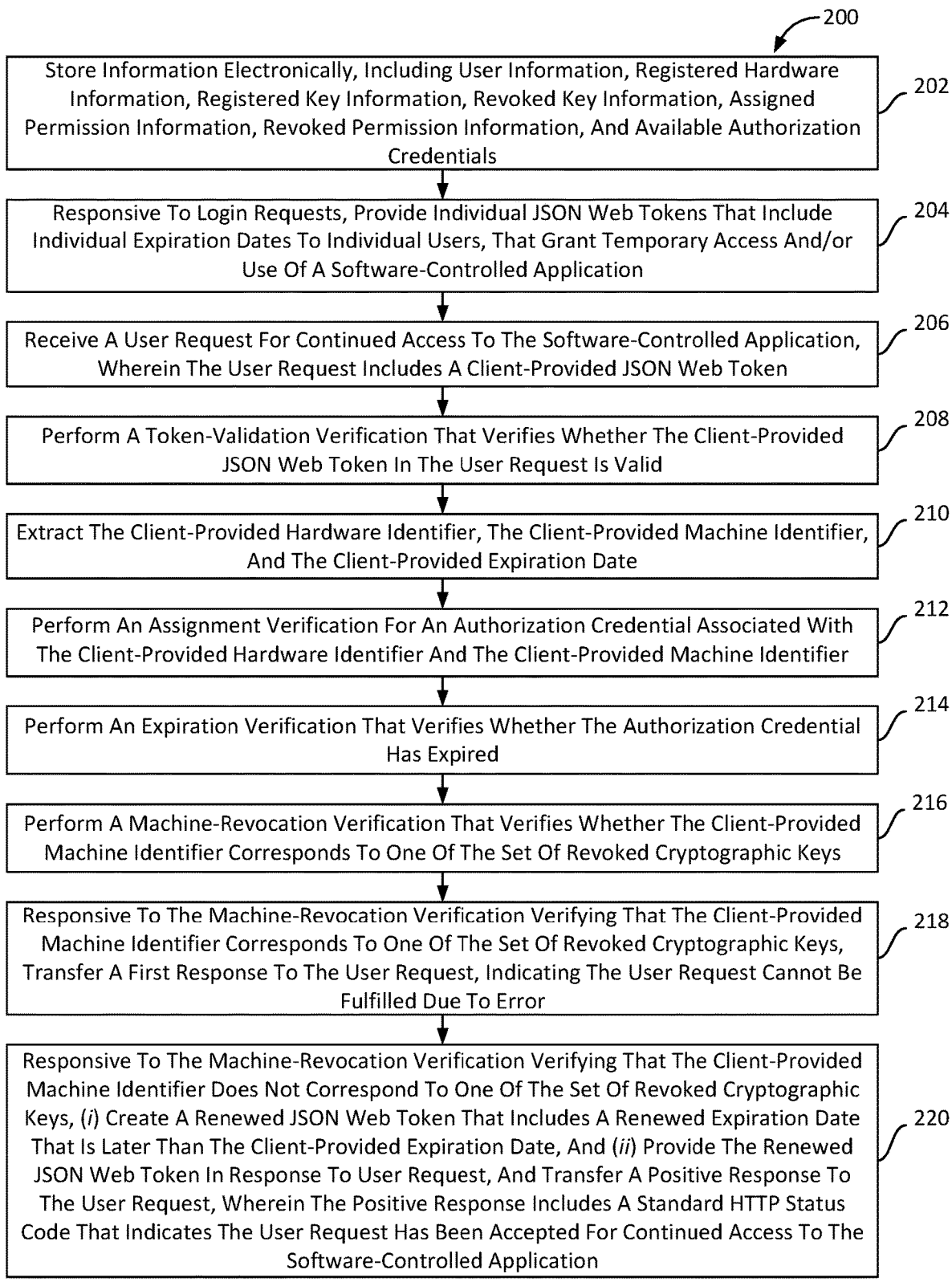
FIG. 2 illustrates a method for using JavaScript Object Notation (JSON) Web Tokens for information security for a particular software-controlled application, in accordance with one or more implementations.

FIG. 2 illustrates a method 200 for using JavaScript Object Notation (JSON) Web Tokens for information security for a particular software-controlled application, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information is stored electronically. The stored information includes one or more of (i) user information that identifies a set of authorized users that are authorized to access and/or use the particular software-controlled application, (ii) registered hardware information that identifies a set of registered client computing platforms that have been registered to access and/or use the particular software-controlled application, (iii) registered key information that identifies a set of registered keys for encryption and/or decryption that have been registered to access and/or use the particular software-controlled application, (iv) revoked key information that identifies a set of revoked keys for encryption and/or decryption that are no longer registered to access and/or use the particular software-controlled application, (v) assigned permission information that identifies a set of assigned authorization credentials that have been assigned to specific users and specific client computing platforms, wherein individual ones of the set of authorization credentials are associated with individual expiration dates, and (vi) revoked permission information that identifies a set of revoked authorization credentials that are no longer assigned for access and/or use the particular software-controlled application. In some embodiments, operation 202 is performed by a storage component the same as or similar to storage component 108 (shown in FIG. 1 and described herein).

At an operation 204, responsive to receiving, from individual users, login requests that include individual user identifiers, individual hardware identifiers, and individual machine identifiers, the individual hardware identifiers are registered, the individual machine identifiers are registered, individual available authorization credentials are assigned to the individual users, and, to the individual users, individual JWTs are provided that include individual expiration dates. The individual JWTs grant temporary access and/or use of the particular software-controlled application. In some embodiments, operation 204 is performed by a token component the same as or similar to token component 117 (shown in FIG. 1 and described herein).

At an operation 206, a user request is received, from a user associated with a client computing platform, for continued access and/or use of the particular software-controlled application. The user request includes (i) a client-provided JWT. The client-provided JWT includes a payload. The payload includes a client-provided expiration date. The user request further includes (ii) a client-provided hardware identifier that identifies the client computing platform, and (iii) a client-provided machine identifier that identifies a public key. In some embodiments, operation 206 is performed by a request component the same as or similar to request component 110 (shown in FIG. 1 and described herein).

At an operation 208, a token-validation verification is performed that verifies whether the client-provided JWT in the user request is valid. In some embodiments, operation 208 is performed by a verification component the same as or similar to verification component 112 (shown in FIG. 1 and described herein).

At an operation 210, the client-provided hardware identifier is extracted, from either the user request or the client-provided JWT, as is the client-provided machine identifier and the client-provided expiration date. In some embodiments, operation 210 is performed by an extraction component the same as or similar to extraction component 111 (shown in FIG. 1 and described herein).

At an operation 212, an assignment verification is performed that verifies whether a particular authorization credential corresponds to one of the set of assigned authorization credentials. The particular authorization credential is associated with both the client-provided hardware identifier and the client-provided machine identifier. In some embodiments, operation 212 is performed by a verification component the same as or similar to verification component 112 (shown in FIG. 1 and described herein).

At an operation 214, an expiration verification is performed that verifies whether the particular authorization credential has expired. In some embodiments, operation 214 is performed by a verification component the same as or similar to verification component 112 (shown in FIG. 1 and described herein).

At an operation 216, a machine-revocation verification is performed that verifies whether the client-provided machine identifier corresponds to one of the set of revoked keys for encryption and/or decryption. In some embodiments, operation 216 is performed by a verification component the same as or similar to verification component 112 (shown in FIG. 1 and described herein).

At an operation 218, responsive to the machine-revocation verification verifying that the client-provided machine identifier corresponds to one of the set of revoked keys for encryption and/or decryption, a first response is transferred in response to the user request. The first response includes a first standard HTTP status code that indicates the user request cannot be fulfilled due to error. In some embodiments, operation 218 is performed by a response component the same as or similar to response component 118 (shown in FIG. 1 and described herein).

At an operation 220, responsive to the machine-revocation verification verifying that the client-provided machine identifier does not correspond to one of the set of revoked keys for encryption and/or decryption, (i) a renewed JWT is created that includes a renewed expiration date that is later than the client-provided expiration date, and (ii) the renewed JWT is provided in response to user request, and a positive response is transferred to the user request. The positive response includes a standard HTTP status code that indicates the user request has been accepted for continued access and/or use of the particular software-controlled application. In some embodiments, operation 220 is performed by a token component and a response component the same as or similar to token component 117 and response component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for using JavaScript Object Notation (JSON) Web Tokens for information security for a software-controlled application, the system comprising:
   one or more hardware processors configured by machine-readable instructions to:
      responsive to receiving, from individual users, login requests that include individual user identifiers, individual hardware identifiers, and individual machine identifiers, provide, to the individual users individual JSON Web Tokens (JWTs) that include individual expiration dates, wherein the individual JWTs grant temporary access and/or use of the software-controlled application;
      receive, from a user associated with a client computing platform, a user request for continued access and/or use of the software-controlled application, wherein the user request includes:
         (i) a client-provided JSON Web Token (JWT), wherein the client-provided JWT includes a payload, wherein the payload includes a client-provided expiration date,
         (ii) a client-provided hardware identifier that identifies the client computing platform, and
         (iii) a client-provided machine identifier that identifies a public key;
      perform one or more verifications that verify whether the user request for continued access and/or use of the software-controlled application has been accepted; and
      responsive to the one or more verifications verifying the user request has been accepted, transfer a first response to the user request, wherein the first response includes a first standard HyperText Transfer Protocol (HTTP) status code that indicates the user request has been accepted.

2. The system of claim 1, wherein the one or more verifications include at least one of a token-validation verification, an assignment verification, an expiration verification, and/or a machine-revocation verification.

3. The system of claim 1, wherein the first response includes a renewed JWT, wherein the renewed JWT includes a renewed expiration date that is later than the client-provided expiration date.

4. The system of claim 1, wherein the user request further includes a client-provided user identifier that identifies the user, and wherein the public key is used for Public Key Infrastructure (PKI).

5. The system of claim 1, wherein the client-provided hardware identifier and the client-provided machine identifier are included in the payload of the client-provided JWT.

6. The system of claim 1, wherein, responsive to the one or more verifications verifying the user request has not been accepted, the one or more hardware processors are further configured to transfer a second response to the user request, wherein the second response includes a second standard HTTP status code that indicates the user request cannot be fulfilled due to error.

7. The system of claim 6, wherein the first standard HTTP status code is either "200" or "201", and wherein the second standard HTTP status code is either "401", "410", "402", "403", or "404".

8. The system of claim 7, further comprising the client computing platform that is associated with the user, wherein the client computing platform includes electronic client storage and one or more processors configured by machine-readable instructions to:
responsive to receiving an individual JWT, store the individual JWT and a timestamp in the electronic client storage;
transfer the user request for continued access and/or use of the software-controlled application, wherein the user request includes the individual JWT;
receive a response to the user request, wherein:
(i) responsive to the response indicating the user request cannot be fulfilled due to error, the one or more processors are configured to determine an amount of elapsed time between a most recently stored timestamp and a current time, and, responsive to the amount of elapsed time exceeding a predetermined grace period, deny the continued access and/or use of the software-controlled application,
(ii) responsive to the response indicating the user request has been accepted, the one or more processors are configured to store a current timestamp in the electronic client storage; and
responsive to the response including the renewed JWT, store the renewed JWT in the electronic client storage.

9. The system of claim 8, wherein transferring the user request is performed at recurring intervals, and wherein the predetermined grace period is longer than the time between individual ones of the recurring intervals.

10. The system of claim 1, wherein the client-provided hardware identifier is a Media Access Control (MAC) address.

11. A method for using JavaScript Object Notation (JSON) Web Tokens for information security for a software-controlled application, the method comprising:
responsive to receiving, from individual users, login requests that include individual user identifiers, individual hardware identifiers, and individual machine identifiers, providing, to the individual users individual JSON Web Tokens (JWTs) that include individual expiration dates, wherein the individual JWTs grant temporary access and/or use of the software-controlled application;
receiving, from a user associated with a client computing platform, a user request for continued access and/or use of the software-controlled application, wherein the user request includes:
(i) a client-provided JSON Web Token (JWT), wherein the client-provided JWT includes a payload, wherein the payload includes a client-provided expiration date,
(ii) a client-provided hardware identifier that identifies the client computing platform, and
(iii) a client-provided machine identifier that identifies a public key;
performing one or more verifications that verify whether the user request for continued access and/or use of the software-controlled application has been accepted; and
responsive to the one or more verifications verifying the user request has been accepted, transferring a first response to the user request, wherein the first response includes a first standard HyperText Transfer Protocol (HTTP) status code that indicates the user request has been accepted.

12. The method of claim 11, wherein the one or more verifications include at least one of a token-validation verification, an assignment verification, an expiration verification, and/or a machine-revocation verification.

13. The method of claim 11, wherein the first response includes a renewed JWT, wherein the renewed JWT includes a renewed expiration date that is later than the client-provided expiration date.

14. The method of claim 11, wherein the user request further includes a client-provided user identifier that identifies the user, and wherein the public key is used for Public Key Infrastructure (PKI).

15. The method of claim 11, wherein the client-provided hardware identifier and the client-provided machine identifier are included in the payload of the client-provided JWT.

16. The method of claim 11, further comprising:
responsive to the one or more verifications verifying the user request has not been accepted, transferring a second response to the user request, wherein the second response includes a second standard HTTP status code that indicates the user request cannot be fulfilled due to error.

17. The method of claim 16, wherein the first standard HTTP status code is either "200" or "201", and wherein the second standard HTTP status code is either "401", "410", "402", "403", or "404".

18. The method of claim 17, further comprising:
responsive to receiving an individual JWT, storing the individual JWT and a timestamp in electronic client storage, wherein the electronic client storage is included in the client computing platform;
transferring the user request for continued access and/or use of the software-controlled application, wherein the user request includes the individual JWT;
receiving a response to the user request;
responsive to the response indicating the user request cannot be fulfilled due to error, determining an amount of elapsed time between a most recently stored timestamp and a current time, and, responsive to the amount of elapsed time exceeding a predetermined grace period, denying the continued access and/or use of the software-controlled application;

responsive to the response indicating the user request has been accepted, storing a current timestamp in the electronic client storage; and responsive to the response including the renewed JWT, storing the renewed JWT in the electronic client storage.

19. The method of claim 18, wherein transferring the user request is performed at recurring intervals, and wherein the predetermined grace period is longer than the time between individual ones of the recurring intervals.

20. The method of claim 11, wherein the client-provided hardware identifier is a Media Access Control (MAC) address.

* * * * *